(12) United States Patent
Tarkiainen et al.

(10) Patent No.: US 7,057,908 B2
(45) Date of Patent: Jun. 6, 2006

(54) METHOD AND ARRANGEMENT IN CONNECTION WITH NETWORK INVERTER

(75) Inventors: Antti Tarkiainen, Riihimäki (FI); Reijo Komsi, Helsinki (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 11/042,342

(22) Filed: Jan. 26, 2005

(65) Prior Publication Data
US 2005/0195624 A1 Sep. 8, 2005

(30) Foreign Application Priority Data
Jan. 27, 2004 (FI) ................................. 20040110

(51) Int. Cl.
*H02M 1/12* (2006.01)
*H02M 1/14* (2006.01)

(52) U.S. Cl. .............................. 363/39; 363/44; 363/47
(58) Field of Classification Search .................. 363/39, 363/44, 45, 47, 48
See application file for complete search history.

(56) References Cited

U.S. PATENT DOCUMENTS 5,844,791 A * 12/1998 Swamy ........................ 363/47
6,009,004 A * 12/1999 Swamy ........................ 363/47
6,271,651 B1 * 8/2001 Stratakos et al. ........... 323/282
6,339,263 B1 * 1/2002 Lejonberg ..................... 307/82
6,469,919 B1 * 10/2002 Bennett ................... 363/56.02
6,618,276 B1 * 9/2003 Bennett ................... 363/56.02
6,885,567 B1 * 4/2005 Lincoln et al. .......... 363/56.01
6,956,352 B1 * 10/2005 Tarkiainen et al. ......... 318/800

* cited by examiner

*Primary Examiner*—Bao Q. Vu
(74) *Attorney, Agent, or Firm*—Dykema Gossett PLLC

(57) ABSTRACT

A method in connection with a network inverter, an LCL network filter (3) being connected between the network inverter (1) and network (2), and the network inverter being arranged to operate as an active converter of harmonic components of electricity, and the method comprises the steps of forming a current reference ($i_{1, ref}$) for the network inverter (1) for producing a desired voltage, selecting a harmonic electric component (v), the proportion of which needs to be changed, forming a current reference ($i_{1, ref}^v$) altering the selected harmonic component (v), summing the generated current reference ($i_{1, ref}^v$) altering the selected harmonic component with the current reference ($i_{1, ref}$) of the network inverter to produce a summed current reference ($i_{1, ref, tot}$), and controlling the network inverter with the summed current reference ($i_{1, ref, tot}$) in a coordinate system bound to the virtual flux linkage of the network inverter by using DTC control.

8 Claims, 3 Drawing Sheets

METHOD AND ARRANGEMENT IN CONNECTION WITH NETWORK INVERTER

BACKGROUND OF THE INVENTION

The invention relates to a method and an arrangement in connection with a network inverter in accordance with the preambles of the independent claims.

The network inverter is used for producing direct voltage from the network alternating voltage, for instance, for a voltage intermediate circuit of a frequency converter. The features of the network inverter include a possibility for bidirectional power flow. Hence power can also be transferred back to the network with the network inverter. Typically this feature of the network inverters has been utilized in connection with motor drives so as to transfer deceleration power generated by the motor back to the network.

In the known manner various devices to be connected to the network cause current distortion or disturbances in the network voltage. In particular, the devices with pulse-like input current from the network generate harmonic current components and cause deterioration in the quality of current. Likewise, the curve form of the network voltage may be distorted due to non-linear loads.

Conventionally passive filter solutions have been used for improving the quality of electricity. These solutions are often bulky and expensive. At a fundamental frequency the impedance of passive filters is capacitive and they consume capacitive reactive power. This must be taken into account when a transformer and supply apparatuses are designed. In addition, a passive filter is not able to adapt to changing distortion circumstances like active filters utilizing modern power electronics.

Active filters are known technology. They have been presented, for instance, in reference [1] by H. Akagi, "New Trends in Active Filters for Power Conditioning", *IEEE Trans. Ind. Applicat.*, vol 32, pp.1312–1322, Nov./Dec. 1996. Likewise, known technology includes methods for actively conditioning network voltage, which have been presented in reference [2] by W. M. Grady, M. J. Samatyj and A. H. Noyola, "Survey of active power line conditioning methodologies", *IEEE Trans. Power Delivery*, vol. 5, pp. 1536–1542, July 1990. As compared with conventional passive methods the active filter is an expensive solution. When the active electric quality enhancement feature can be implemented in the network inverter supplying the voltage intermediate circuit of the frequency converter the investment costs of the solution are low, the solution does not generate harmful capacitive reactive power and the quality of filtering will be better.

The reference [3] by F. Abrahamsen and A. David, "Adjustable speed drive with active filtering capability for harmonic current compensation", in *Proc. IEEE PESC '95*, vol. 2, 1995 pp. 1137–1143, presents a solution for the use of a network inverter for active filtering of harmonic currents of other loads coupled to the same connection point. The solution of the reference publication does not include an LCL network filter.

The reference [4] by P. Brogan and R. Yacamini, "Harmonic control using an active drive", *IEE Proc.-Elect. Power Appl.*, vol.150. pp. 14–20. Jan. 2003, presents a solution, in which a network inverter is used for lowering the network voltage harmonics. Instead of an LCL network filter this solution employs an absorption circuit tuned to the switching frequency of an electronic power converter. In addition, calculation of harmonic current references employs a parametrized model that takes into account the impedance prevailing at the connection point of the electronic power converter. The authors have presented this in greater detail in the document [5] P. Brogan and R. Yacamini, "Stability of an active filter based on voltage feedback" in *Proc. 8$^{th}$ Eur. Conf. on Power Electronics and Applications,* 1990, cd-rom. The parametrized model poses problems, however, because the parameters vary depending on the connection point.

The network inverter based on direct torque control, i.e. operating on DTC principle, is known technology and set forth in patent application PCT/FI02/00221 and in reference [6] R. Pöllänen, A, Tarkiainen, M. Niemelt and J. Pyrhönen, "Supply voltage sensorless reactive power control of DTC modulation based line converter with L- and LCL-filters" in *Proc. 10$^{th}$ Eur. Conf. On Power Electronics and Applications,* 2003, cd-rom. It is also known to use an LCL network filter in connection with both network inverters and active filters (for example [6] and [7] M. Sonnenschein and M. Weinhold, "Comparison of time-domain and frequency-domain control schemes for shunt active filters", *Eur. Trans. Electr. Power*, vol. 9, pp. 5–19, January/February 1999). Inverter current control with a control structure of the same type as in the present invention is also known technology and presented, for instance, in references [8] P. Mattavelli, "A closed-loop selective harmonic compensation for active filters", *IEEE Trans. Ind. Applicat.*, vol. 37, pp.81–89, January/February 2001 and [9] S. Ponnaluri and A. Brickwedde, "Overriding individual harmonic current control with fast dynamics for active filter" in *Proc. IEEE PESC'01*, vol. 3, 2001, pp. 1596–1601.

BRIEF DESCRIPTION OF THE INVENTION

The object of the present invention is to provide a method and an arrangement implementing the method, which enable active improvement of the quality of network electricity in connection with using a network inverter. This is achieved with the method and the arrangement which are characterized by what is disclosed in the characterizing parts of the independent claims. The preferred embodiments of the invention are disclosed in the dependent claims.

The invention is based on the idea that the quality of the network electricity is improved by using a network inverter that implements a fast, direct-torque-control-based control method for controlling harmonic currents together with an LCL network filter connected between the network inverter and the network. Harmonic currents supplied to the network by a DTC-controlled network inverter equipped with the LCL network filter can be controlled fairly accurately. The obtained whole that is suitable for the control of harmonic network currents can be used for reducing either second current harmonics or network voltage harmonics. In addition to these functions the system can be used at the same time for conventional network inverter functions, i.e. for transferring effective power between a direct voltage intermediate circuit and an AC network and for reactive power compensation.

The method and the arrangement of the invention have an advantage that the harmonic current compensation provided by the control system and the LCL network control is fast and accurate. With the DTC-controlled network inverter of the invention it is possible to supply to the network harmonic currents that are advantageously set to improve the quality of electricity.

In addition, in the compensation method of voltage harmonics according to an embodiment of the invention the impedance behaviour of the network is not modelled, but it is taken into account by turning a harmonic current vector reference for an amount of a phase shift caused by the network impedance.

The method and the arrangement of the invention enhance the features of the network inverter that can be used for active improvement of the quality of electricity. In this context the active improvement of the quality of electricity refers to compensation of current harmonics supplied to the network or compensation of voltage harmonics of a connection point. The compensation of current harmonics can be used for reducing current distortion supplied to the network by nonlinear loads connected in parallel with the network inverter. The compensation of voltage harmonics can be used for active improvement of the quality of voltage.

BRIEF DESCRIPTION OF THE DRAWINGS

In the following the invention will be described in greater detail in connection with preferred embodiments with reference to the attached drawings, in which.

DETAILED DESCRIPTION OF THE INVENTION

A DTC-controlled network inverter is disclosed in patent application PCT/FI02/00221 and in publication [6]. The inverter control is based on a virtual flux linkage vector of the inverter $\underline{\psi}_1$ defined as integral of a space vector $\underline{u}_1$ of the inverter voltage, and on synchronic coordinates linked thereto, where current vector control is performed. The virtual flux linkage vector of the inverter is estimated by equation $$\underline{\psi}_1 = \int \underline{u}_1 dl \tag{1}$$

To control the network current harmonics of the inverter, in accordance with the method there is determined a unit vector $\underline{s}^\nu$ corresponding to each one or more controllable sequence. For instance, in the case of the fifth negative harmonic sequence (5−) the unit vector is $$\underline{s}^{5-} = s_\alpha^{5-} + js_\beta^{5-}. \tag{2}$$

The unit vector is rotated at the angular speed of the corresponding harmonic sequence in the same rotation direction with the corresponding harmonic sequence. For instance, in the case of the sequence 5− the unit vector can be formed as follows $$\underline{s}^{5-} = \cos(5\omega_s t) - j\sin(5\omega_s t), \tag{3}$$

where $\omega_s$ is an estimate of the network angular speed. In accordance with the invention, harmonic, rectangular, synchronous coordinates corresponding to said harmonic are attached to the unit vector such that the d-axis of the coordinates is parallel with the unit vector and the q-axis is perpendicular thereto. The space vector $\underline{i}_2$ of the network current of the inverter is transformed into said harmonic, synchronous coordinates by equations $$i_{2d}{}^{5-} = Re\{(\underline{s}^{5-})^* \cdot \underline{i}_2\} = s_\alpha^{5-} i_{2\alpha} + s_\beta^{5-} i_{2\beta} \tag{4}$$

$$i_{2q}{}^{5-} = Im\{(\underline{s}^{5-})^* \cdot \underline{i}_2\} = s_\alpha^{5-} i_{2\beta} - s_\beta^{5-} i_{2\alpha}, \tag{5}$$

where an asterisk denotes complex conjugation. The current vector components transformed into the harmonic, synchronous coordinates are low-pass filtered. The low-pass filtered components $i_{2d,f}{}^{5-}$ and $i_{2q,f}{}^{5-}$ are subtracted from the corresponding references $i_{2d,ref}{}^{5-}$ and $i_{2q,ref}{}^{5-}$ so as to form difference signals $i_{2d,e}{}^{5-}$ and $i_{2q,e}{}^{5-}$. The obtained difference signals are treated with a PI regulator algorithm.

The output signal of the PI regulators represents a reference vector $\underline{i}_{1,ref}{}^{5-}$ of the inverter harmonic current in said harmonic, synchronous coordinates. Transformation into a stationary $\alpha\beta$ coordinates is performed by equations $$i_{1\alpha,ref}{}^{5-} = Re\{\underline{s}^{5-} \underline{i}_{1,ref}{}^{5-}\} = s_\alpha^{5-} i_{1d,ref}{}^{5-} - s_\beta^{5-} i_{1q,ref}{}^{5-} \tag{6}$$

$$i_{1\beta,ref}{}^{5-} = Im\{\underline{s}^{5-} \underline{i}_{1,ref}{}^{5-}\} = s_\alpha^{5-} i_{1q,ref}{}^{5-} + s_\beta^{5-} i_{1d,ref}{}^{5-}. \tag{7}$$

Figure 4:
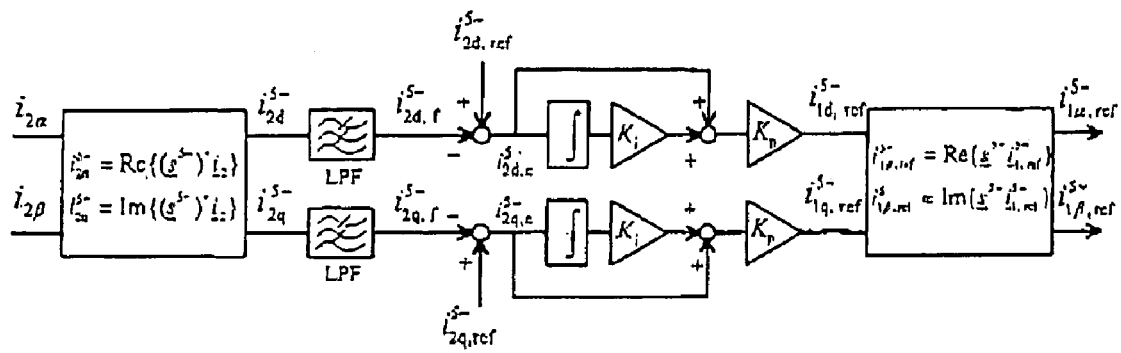
FIG. 4 shows an example of producing a current reference of the $5^{th}$ negative sequence of $\alpha$ coordinates of a converter.

FIG. 4 illustrates this as a block diagram. From the stationary coordinates the reference vector of the harmonic current of the inverter is transformed into coordinates attached to a virtual flux linkage vector of the inverter by equations $$i_{1q,ref}^{5-(dq^{1+})} = \frac{\psi_{1\alpha} i_{1\alpha,ref}^{5-} + \psi_{1\beta} i_{1\beta,ref}^{5-}}{|\underline{\psi}_1|} \tag{8}$$

$$i_{1q,ref}^{5-(dq^{1+})} = \frac{\psi_{1\alpha} i_{1\beta,ref}^{5-} - \psi_{1\beta} i_{1\alpha,ref}^{5-}}{|\underline{\psi}_1|}, \tag{9}$$

where the superscript $(dq^{1+})$ indicates that said space vector component is presented in coordinates other than the synchronous coordinates rotating with said harmonic space vector. In the coordinates attached to the virtual flux linkage vector of the inverter, current reference vector components corresponding to harmonic frequencies are summed with fundamental frequency references $i_{1d,ref}$ and $i_{1q,ref}$ from circuits controlling the fundamental wave power factor and the intermediate circuit voltage. The obtained current reference components $i_{1d,ref,tot}$ and $i_{1q,ref,tot}$ are used in the current vector control system of the publication PCT/FI02/00221. In the case of four harmonic components (here 5−, 7+, 11− and 13+) the component-form current references in the current vector control system are calculated as follows $$i_{1d,ref,tot} = i_{1d,ref} + i_{1d,ref}^{5-(dq^{1+})} + i_{1d,ref}^{7+(dq^{1+})} + i_{1d,ref}^{11-(dq^{1+})} + i_{1d,ref}^{13+(dq^{1+})} \tag{10}$$

$$i_{1q,ref,tot} = i_{1q,ref} + i_{1q,ref}^{5-(dq^{1+})} + i_{1q,ref}^{7+(dq^{1+})} + i_{1q,ref}^{11-(dq^{1+})} + i_{1q,ref}^{13+(dq^{1+})}. \tag{11}$$

Figure 5:
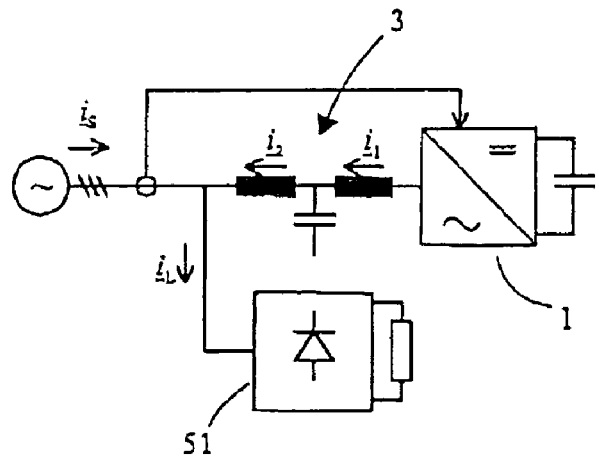
FIG. 5 shows an embodiment of the invention suitable for reducing current harmonics of a nonlinear load.

In current harmonic compensation of a nonlinear load it is possible to measure the common network current of the nonlinear load and the network inverter, whereby there is no need to measure both separately. In the above-described control arrangement of harmonic network currents the control variable used is the space vector $\underline{i}_s$ of the sum current of the inverter 1 and the load 53, instead of space vector $\underline{i}_2$ of the network current of the network inverter, as shown in FIG. 5. The load current in FIG. 5 is denoted by $\underline{i}_L$.

Generally, to remove the sum current harmonics, the references of the harmonics are set to zero. Cross-effect occasionally appearing in the control system of current harmonics between the d- and q-axes of the harmonic, synchronous coordinates can be reduced by rotating the reference vector of the harmonic inverter current.

Figure 1:
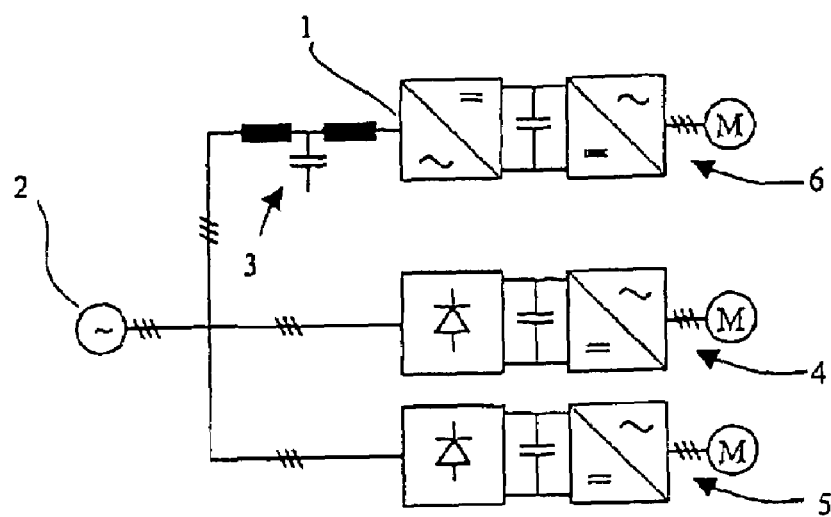
FIG. 1 shows an embodiment of the invention.

FIG. 1 shows one application of the invention, where a network inverter provided with active filtering features is used for filtering the current harmonics of the loads connected to the same connection point. In FIG. 1 three separate motor drives, each being controlled with a frequency converter, are connected to the same network point. Each frequency converter has its own direct voltage intermediate circuit. The frequency converters 4 and 5 have a diode bridge rectifier, whereas the frequency converter 6 of the invention has a network inverter 1, by which it is possible to reduce disturbances produced by the frequency converters connected to the connection point.

Figure 6:
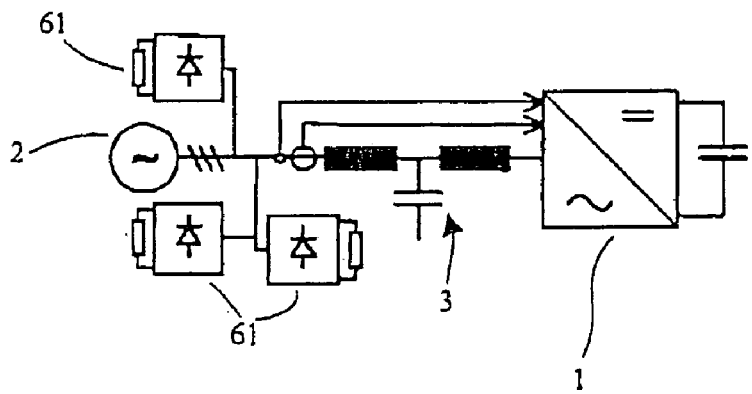
FIG. 6 shows an embodiment of the invention suitable for reducing voltage harmonics.

The network inverter used for compensation of voltage harmonics is shown in FIG. 6. The voltage distortion to be compensated may originate from nonlinear loads 61 connected to the same supply transformer secondary voltage with the network inverter. Voltage distortion may also pass through the transformer if the primary voltage of the transformer is already distorted. It is not necessary to know the origin of the voltage distortion to compensate for it. To compensate for the voltage harmonics the network current references of the inverter are determined on the basis of the voltage harmonics of the connection point. The space vector $\underline{u}_2$ of the connection point voltage is measured and its harmonics are determined analogically together with the previously described evaluation of network current harmonics of the inverter. PI-regulators operating in the harmonic, synchronous coordinates produce a reference for a network current harmonic of the inverter, for example $i_{2d,ref}^{5-}$ and $i_{2q,ref}^{5-}$, which are used in the previously described network current harmonic control system. The inverter network current must be measured as well so as to control its harmonics. The network impedance is taken into account in accordance with the embodiment by turning the reference vector of the harmonic network current for an amount of the negative phase angle of the network impedance.

Figure 7:
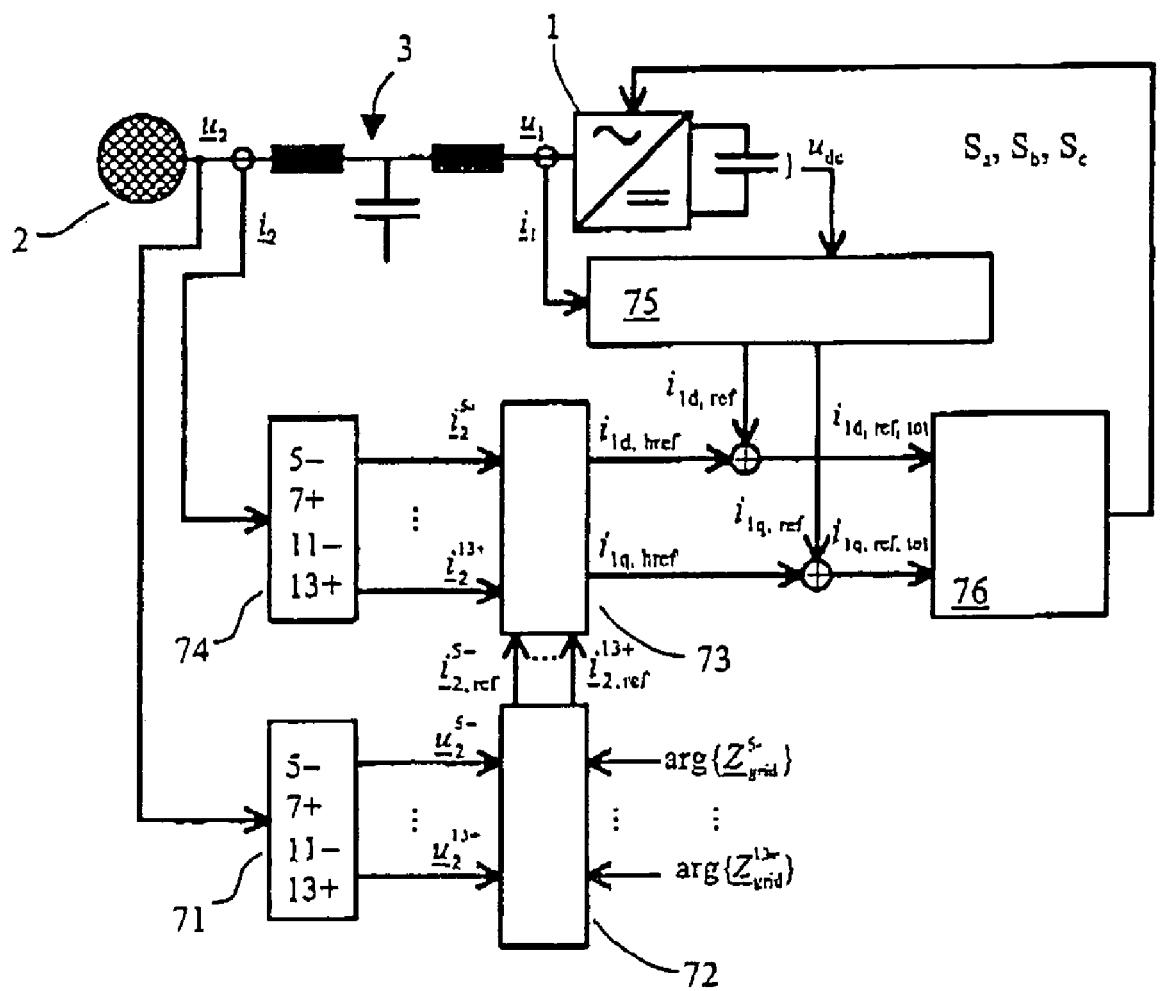
FIG. 7 shows an example of a control system of voltage harmonics at a connection point.

The compensation system of the voltage harmonics is shown schematically in FIG. 7. An LCL network filter 3 is connected between the network and the network inverter. Voltage $\underline{u}_2$ is measured and the harmonic components of the voltage are determined in accordance with the embodiment of the invention in block 71. This block produces at its output the harmonic components $\underline{u}_2^v$ of the voltage. In block 72, whose input includes said harmonic components of the voltage and the angles of network impedances at frequencies $\arg\{Z_{grid}^v\}$, there are formed current references $i_{2,\,ref}^v$ which reduce voltage harmonics and which are entered in a current harmonic control block 73 as reference values for harmonic currents corresponding to the harmonic voltage components. At the second input the control block of current harmonics will have harmonic current components $i_2^v$ from the output of the current harmonic evaluation block.

From the output of the current harmonic control block 73 are obtained component-form current references $i_{1d,\,href}$, $i_{1q,\,href}$ which alter the harmonic component and which include the references $i_{1,\,ref}^v$ of all the selected harmonic sequences summed.

These current references $i_{1d,\,href}$, $i_{1q,\,href}$ are summed with current references $i_{1d,ref}$, $i_{1q,ref}$ obtained from the regulator 75 of the intermediate circuit voltage and the fundamental wave reactive power so as to provide summed component-form current references $i_{1d,ref,tot}$, $i_{1q,ref,tot}$, the summed current reference pair is further applied to DTC control 76, which generates switching references $S_a$, $S_b$, $S_c$ for the network inverter in the manner known per se. The, input of the regulator 75 is the input current $i_1$ of the voltage intermediate circuit voltage $u_{dc}$ and the network inverter.

It should be noted that by setting the current references $i_{2,\,ref}^v$ to zero, in block diagram of FIG. 7 it is possible to implement the solution that minimizes the harmonic components of the current.

Figure 2:
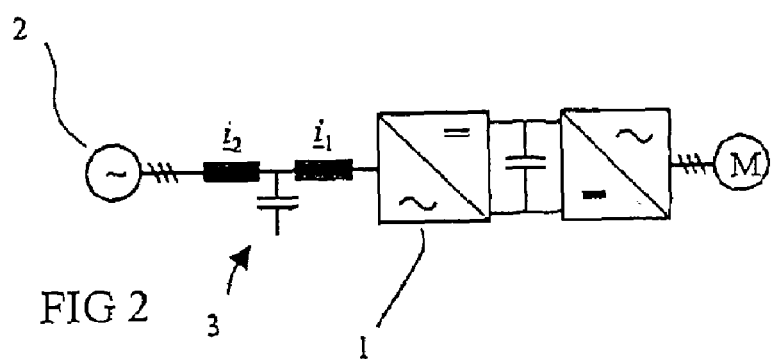
FIG. 2 shows another embodiment of the invention.

FIG. 2 shows a single drive that can be employed by means of the invention, for instance, for reducing the voltage distortion of the connection point.

Figure 3:
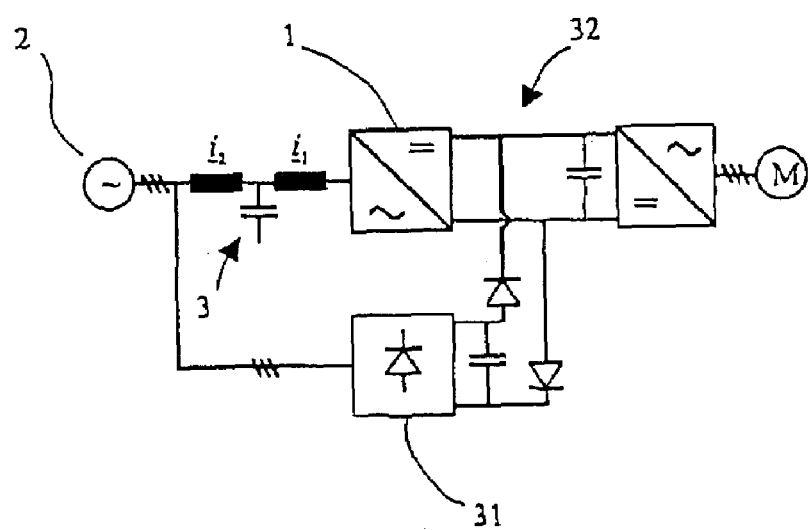
FIG. 3 shows yet another embodiment of the invention.

FIG. 3 shows a parallel connection of a network inverter 1 and a diode bridge rectifier 31 with diodes separating the intermediate circuits in accordance with the invention. When the power direction is from an AC electric network 2 to a DC voltage intermediate circuit 32 the network inverter 1 acts as an active filter the effective power passing through the diode bridge rectifier 31. In a situation of electronic power inversion the network inverter 1 transfers the necessary effective power from the DC voltage circuit to the AC electric network.

When the power direction is from the network to the DC intermediate circuit 3 the diode bridge acts as a rectifier and the network inverter 1 compensates for diode bridge harmonics. Because the compensation requires a higher DC voltage than that generated by the diode bridge, the intermediate circuit of the network inverter is separated by diodes from the DC intermediate of the frequency converter. When the power direction is from the motor to the DC intermediate circuit, the intermediate circuit voltage rises and at a given point it exceeds the voltage set as the network inverter reference.

When the intermediate circuit voltage exceeds the reference level of the network inverter DC voltage, the inverter mode changes and, instead of compensation, it starts supplying the energy of the intermediate circuit of the frequency converter back to the network. Thus the inverter acts as the intermediate circuit voltage regulator.

This embodiment has an advantage that the diode bridge can be rated for high motor power, but the network inverter only according to compensation power and deceleration power of short duration. The alternative is that all power is supplied through a high-power network inverter. The costs of this alternative, are higher than the costs of the solution according to the embodiment.

Control structures implemented by software included in the invention can be realized in several different ways. Instead of reducing the harmonics of current or voltage, the system of the invention can also be used for their intentional and controllable generation, if this is appropriate for the application. The invention and its embodiments are thus not restricted to the above-described examples but they may vary within the scope of the claims.

The invention claimed is:

1. A method in connection with a network inverter, an LCL network filter being connected between the network inverter and network, and the network inverter being arranged to act as an active converter of harmonic components of electricity, the method comprising a step of forming a current reference ($i_{1,\,ref}$) for the network inverter for producing a desired voltage, the method comprising:

selecting a harmonic electric component, the proportion of which needs to be changed, forming a unit vector ($\underline{s}^v$), which rotates at the speed of the selected harmonic component, attaching a rectangular coordinate system to the unit vector, determining the magnitude of network current ($\underline{i}_2$), transforming a space vector of the network current into said rotating coordinate system, dividing the space vector of the network current into a rectangular d and q components ($i_{2d}{}^v$, $i_{2q}{}^v$), low-pass filtering the network current components to obtain low-pass filtered components ($i_{2d, f}{}^v$, $i_{2q, f}{}^v$), forming reference values ($i_{2d, ref}{}^v$, $i_{2q, ref}{}^v$) for the magnitude of the selected harmonic current, subtracting the low-pass filtered components from the corresponding reference values to provide difference signals ($i_{2d, e}{}^v$, $i_{2q, e}{}^v$), applying the difference signals to PI algorithm to obtain reference signals ($i_{1d, ref}{}^v$, $i_{1q, ref}{}^v$), converting the component-form current reference signals to a current reference vector $\underline{i}$ ($\underline{i}_{1, ref}{}^v$), summing the formed current reference ($\underline{i}_{1, ref}{}^v$) altering the harmonic component with the current reference ($\underline{i}_{1, ref}$) of the network inverter to produce a summed current reference ($\underline{i}_1$, ref, tot), and controlling the network inverter with the summed current reference ($\underline{i}_1$, ref, tot) in a coordinate system linked to the virtual flux linkage of the network inverter by using DTC control.

2. The method of claim 1, wherein the formation of current reference ($\underline{i}_{1, ref}{}^v$) altering the harmonic component comprises:

transforming the current reference vector $\underline{i}$ ($\underline{i}_{1, ref}{}^v$) into stationary $\alpha\beta$ coordinates, transforming the current reference vector ($\underline{i}_{1, ref}{}^v$) from the stationary $\alpha\beta$ coordinates into coordinates linked to the virtual flux linkage of the network inverter to obtain a current reference ($\underline{i}_{1, ref}{}^{v(dq1+)}$).

3. The method of claim 1, wherein the selection of the harmonic component of electricity comprises a step of selecting one or more harmonic components of electricity, the proportion of which needs to be changed.

4. The method as claimed in claim 1, wherein the formation of a reference value of the selected harmonic current comprises the steps of forming the reference value of the harmonic current ($i_{2d, ref}{}^v$, $i_{2q, ref}{}^v$) on the basis of the harmonic voltage corresponding to said harmonic current.

5. The method as claimed in claim 1, wherein the reference values ($i_{2d, ref}{}^v$, $i_{2q, ref}{}^v$) for the magnitude of the selected harmonic current are selected to be zero so as to compensate for the harmonic currents.

6. The method of claim 4, wherein the formation of the harmonic current reference value ($i_{2d, ref}{}^v$, $i_{2q, ref}{}^v$) on the basis of the harmonic voltage comprises:

forming a unit vector, which rotates at the speed of the selected harmonic component, attaching a rectangular coordinate system to the unit vector, determining the magnitude of voltage, transforming a space vector of voltage into said rotating coordinate system, dividing the space vector of the voltage into rectangular d and q components, low-pass filtering the voltage components, forming reference values for the magnitude of the selected harmonic voltage, subtracting the low-pass filtered components from the corresponding reference values to provide difference signals, applying the difference signals to PI algorithm to obtain reference signals, converting the component-form current reference signals into a current reference vector, determining the network impedance at the frequency of the harmonic component, and forming the harmonic current reference value by turning the current reference vector for an amount of a negative phase angle of the network impedance.

7. An arrangement in connection with a network inverter, an LCL network filter being connected between the network inverter and network, and the network inverter being arranged to act as an active converter of harmonic components of electricity, comprising:

means for selecting the harmonic component of electricity, the proportion of which needs to be changed, means for forming a current reference altering the selected harmonic component, summing means for summing the current reference altering the formed harmonic component and the current reference of the network inverter, control means for controlling the network inverter with the summed current reference in the coordinates linked to the virtual flux linkage of the network inverter by using DTC control.

8. An arrangement as claimed in claim 7, wherein the arrangement also comprises a DC voltage intermediate circuit and a diode bridge rectifier, whose input is connected directly to the network, the outputs of the DC voltage intermediate circuit and the diode bridge rectifier being connected to the same DC voltage intermediate circuit through diodes such that the power can be transferred through the diode bridge and only through the network inverter to the network.

* * * * *